Feb. 25, 1969 J. RÖHRIG 3,430,000

CIRCUIT ARRANGEMENT FOR TESTING LINES IN COMMUNICATION SYSTEMS

Filed Nov. 26, 1963

INVENTOR.
JOSEF ROHRIG

BY
Stiee & Stiee
ATTORNEYS

United States Patent Office 3,430,000
Patented Feb. 25, 1969

3,430,000

CIRCUIT ARRANGEMENT FOR TESTING LINES IN COMMUNICATION SYSTEMS

Josef Röhrig, Munich, Germany, assignor to Siemens Aktiengesellschaft, a corporation of Germany Filed Nov. 26, 1963, Ser. No. 325,967
Claims priority, application Germany, Apr. 11, 1963, S 84,673
U.S. Cl. 179—18 23 Claims
Int. Cl. H04m 1/24

ABSTRACT OF THE DISCLOSURE

In a communication system wherein the idle condition of test lines therein is indicated by a first potential and the occupied condition by a second potential, a circuit arrangement formed of a test circuit which includes the particular test line, a potential sensing circuit connected to the test circuit, a first switching device for rendering the sensing circuit inoperative in response to the presence of the first potential therein, a second switching device for de-actuating the first switching device after a predetermined period of time to restore the sensing circuit to operative condition for another period of time thereafter.

*Disclosure*

Figure 1:
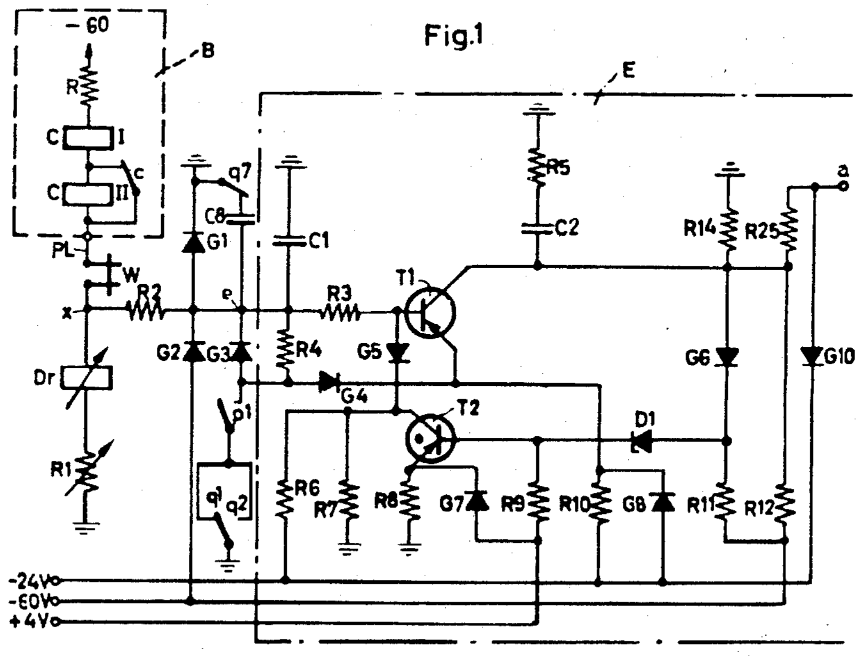

The invention disclosed herein is concerned with a circuit arrangement for testing lines in communication, and particularly telephone systems.

Telephone systems pose among others the problem of connecting switching devices and lines to and with each other, depending on what is required for extending given connections. In order to extend a connection, a plurality of parallel and similar switching devices and lines are in known manner made available, thus providing, for each connection operation, a plurality of through-connection possibilities. Of a plurality of through-connection paths, a single idle path which is ready for operation is selected and seized and is blocked or busied with respect to further switching-through operations, whereupon the switching-through is effected. Testing lines are for this purpose provided in known manner, which are assigned to inputs of switching members, lines and the like. Moreover, switching devices, for instance selectors, couplers and the like, which have their outputs connected selectively to such inputs, or else setting devices such as for instance markers, which are common to selectors, couplers and the like, are provided with circuits for testing the respective outputs. A testing operation is effected by connecting test lines and test circuits, thus preparing and initiating a through connection. The following problems as to circuitry result for the testing operation:

(1) Determination of the seizure conditions of several test lines (idle, that is, ready for being seized, or not seizable):

(1.1) Simultaneous determination;
(1.2) Successive individual determination.

(2) Selection of a single seizable test line:

(2.1) Selection in accordance with priority switching sequence;
(2.2) Selection in accordance with time sequence.

(3) Effecting the blocked or busied condition of the selected test line.

(4) Signaling the successful testing to the testing switch member (for instance selector).

(5) Signaling the seizure to the blocked switch member.

The conditions of seizure (idle or busied) are indicated on test lines by different voltages so as to enable determination thereof. Voltages on test lines are determined by test circuits.

The present invention relates to a circuit arrangement for communication and particularly telephone systems, in which the idle condition and possibly released condition is indicated on test lines by a first voltage potential and the blocked condition by a second voltage potential, and in which the instantaneous condition of seizure of a test line is determined by test circuit means which after determination of an "idle" condition, block the test line.

In known circuit arrangements of this type, test lines lead at their inputs to resistors which in their turn are connected with a first voltage potential which characterizes the idle condition of the test line. The determination of the condition of seizure and the selection of a single seizable test line can be effected by a plurality of test circuits which simultaneously test several test lines, one of which test circuits, which determines the "idle" condition, always has preference over all other test circuits and disconnects all of the latter and blocks even the test line tested by it by connecting the second voltage potential. However, the determination of the condition of seizure and the selection of a single seizable test line can be effected by a single test circuit which is connected successively to the test lines by a rotary selector, a relay chain or the like, and upon determination of a first seizable test line in the sequence of the connecting devices, interrupts the connecting cycle and blocks said test line. In order to block the test line, a second voltage potential is connected to the latter. The signaling of the successful testing and of the seizure is brought about by the circuit which is thus produced.

Similarly, however, the condition of seizure of test lines can also be indicated by their internal resistance, which is variable, by switching the resistor to which the test line leads.

Furthermore, in other known circuit arrangements, conditions of seizure of test lines are also indicated by corresponding voltage potentials and by specific internal resistances of the corresponding test lines.

The resistors to which the test lines lead at the inputs of switching devices or lines or their repeaters are preferably windings of relays, known as seizure or private relays, which also cause the signaling of the seizure. These relays frequently have two windings connected in series, one of which is short-circuited in the condition of readiness for seizure. By this short circuit, the increase in current upon the closing of a test circuit, passing over the other winding is made steeper in known manner, and accordingly the testing operation is accelerated. Upon seizure of a test line, the winding which is initially short-circuited, is included in the test circuit, thus reducing the current consumption and increasing the dependability of blocking.

Upon the release of a connection (call), the blocking of a test line by the test circuit is interrupted by disconnecting the test circuit therefrom. The test line which has been busied until that instant is thereupon likewise immediately interrupted by the switching device (or the like) which has been occupied until that time, by the deenergization of the relay in the test line, until complete release thereof. During the release time of such relay, the voltage potential characterizing the "idle" condition is accordingly actively present on this test line, although the respective input is not yet seizable. If a testing is at this instant initiated, by connection of another test circuit, the current in the test line rises first just as high as upon the testing of an idle test line, despite the increased resistance of the test line, as a result of the voltage induced in the windings of the said relay by the preceding condition of "release," thereupon somewhat dropping again.

The evaluation of the test current to distinguish test lines of a releasing call and idle test lines, is known from a circuit arrangement in which the test circuit in the testing arrangement is closed over a resistor, and wherein the testing of releasing connections is prevented, by evaluating the voltage drop at this resistor after a constant current is established in the test circuit, the value of which depends on whether one or both windings of the seizure relay are included in this circuit.

One disadvantage of this circuit arrangement resides, however, in that the testing operation is determined with regard to its duration by the relatively long building-up time of the test current after the closing of the test-current circuit. However, in order to reduce the seizure time, testing circuits for central devices require a testing operation of much shorter duration that the building-up time of the testing current after the closure of the test current circuit.

In order to solve this problem, there has already been proposed a test circuit whereby the steepness of the increase in current can be determined by differentiation of the test circuit current. However, when the testing is effected over a cable, the differentation of the rise in current requires special measures in order to distinguish between idle lines and lines of releasing calls. The current rise has in such cases at first a steep slope due to the discharge current of the previously charged cable. By way of comparison, the slope of the rise of the current, upon testing over cable on a line of a releasing connection, is steeper than when testing an idle line without cable.

The object of the present invention, namely, to enable in the testing of lines over a cable, in a simplified and time-saving manner, the elimination of lines involved in connections which are being released, is achieved by an arrangement in which a test circuit is formed which includes the test line involved and the particular momentary condition of seizure of the line is determined by test circuit means for ascertaining the condition of seizure of the test line connected thereto by determination of the presence of potential in said test circuit representative of said first or second voltage potential, the test circuit means comprising test switch means for rendering the test circuit means inoperative, means responsive to the presence of a potential in said test circuit representing said first voltage potential, in the event of continued existence of said circuit, for actuating said test switch means to render said test circuit means inoperative, test switch means for deactuating said first mentioned test switch means immediately following a first predetermined period of time, to restore said test circuit means to operative condition, for a second predetermined period of time, whereby the actual conditions of seizure of the test line are determinable by the test circuit means from the test line voltage potential, in the idle conditioning, present prior to the expiration of said second period of time, and in the releasing condition, present after expiration of said second period of time.

The test switch means can be operatively connected during this entire time interval and measure the value of the voltage at the test line, or can be operatively connected only temporarily during such time interval and the slope of the rise in voltage at the test line can be determined upon or even before reaching the second voltage potential, by means of differentiating switch means, for instance a capacitor, so as to ascertain (extrapolate) from the slope the voltage response on the test line during this entire time span.

The invention makes it possible to reduce the testing time, as compared with known test circuits, owing to the evaluation of the test current during its rise after the connecting-through of a test circuit, so that test lines of releasing connections can also be recognized before the end of the building-up of the test current, during which the test currents have the same magnitude, upon testing an idle line and upon testing a line of a releasing connection.

Another advantage of the invention resides in that cable discharges take place during the time interval when the test switch means are operatively ineffective and therefore cannot affect the test switch means.

The combination of the aforementioned advantages results in the further advantage of utilizing for testing purposes the reaction time of electronic switching means upon testing inputs of test lines which extend over relays of customary construction and over cables.

In accordance with a further feature of the invention, a test circuit is advantageously formed by connecting to a line to be tested, a measuring resistance which causes, by suitable electrical matching to the seizure or private relay windings, a voltage potential at the test line which remains constant during the rise of current in the test line. The advantage obtained thereby is that the test line voltage evaluated by high resistance electronic voltage test circuit means reaches, after the connecting-through of a test circuit of steep time slope, a constant value as a result of which the testing time can be considerably shortened.

Another advantage is, in accordance with a further feature of the invention, in that the case of testing over cable, the cable discharge time, and accordingly the entire testing time is shortened by formation of a discharge circuit which has substantially lower resistance than the resistance of the test circuit.

Still another advantage results, in accordance with a further feature of the invention, from the blocking of the test line during the time interval and from the individual and different determination of the time intervals of a plurality of testing circuits testing possibly the same lines, whereby double testing is definitely excluded.

Figure 2:
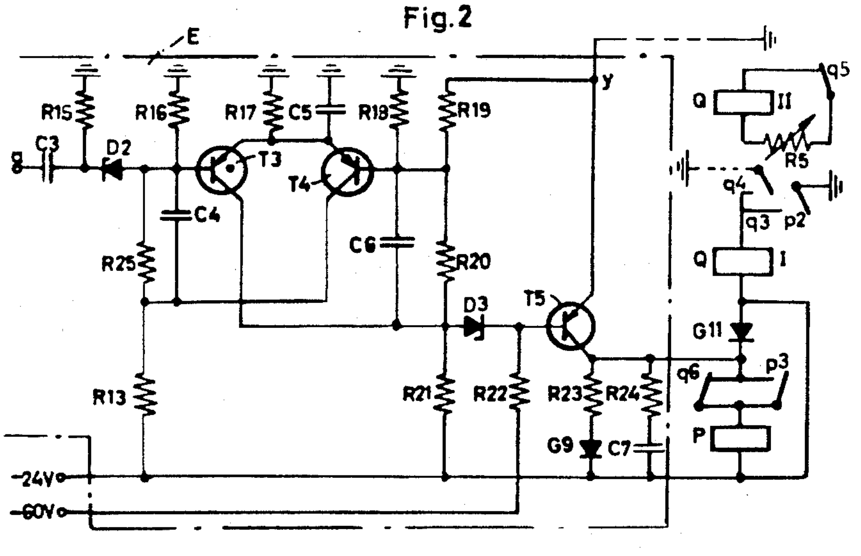
Figure 3:
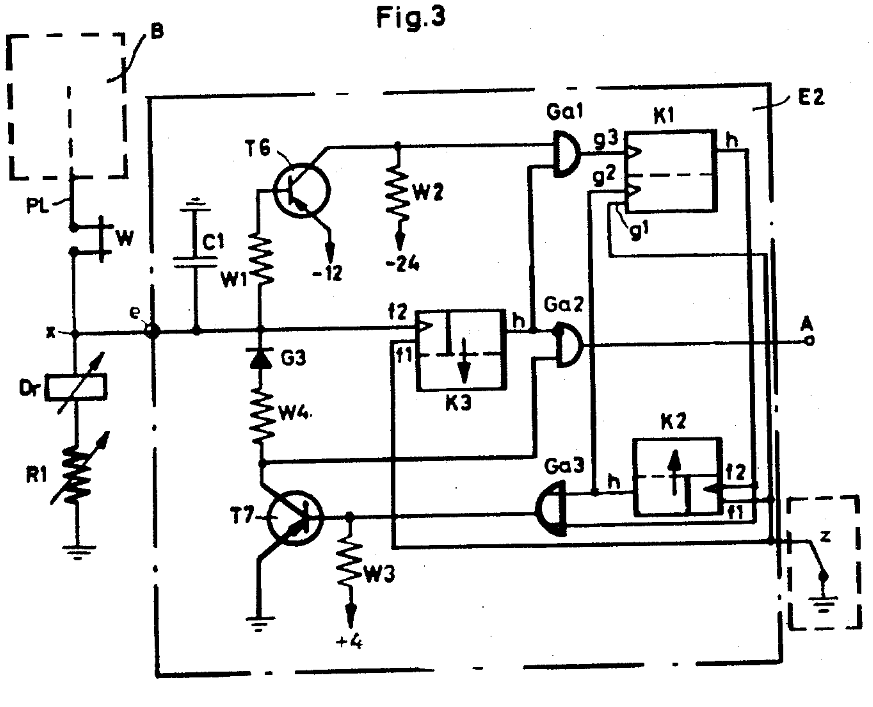
Figure 4:
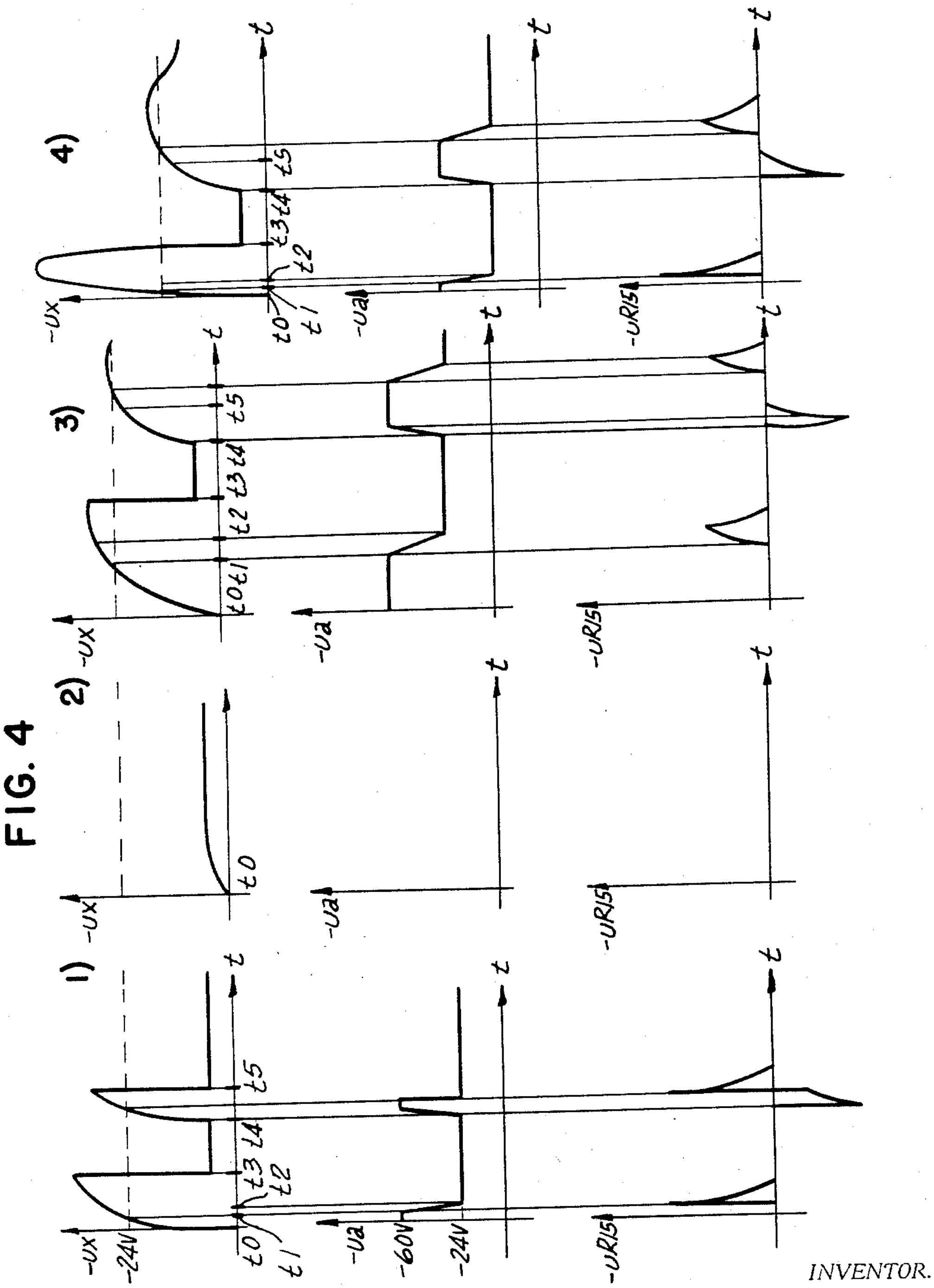

The various objects and features of the invention will appear from the description which is rendered below with reference to the accompanying schematic drawings showing only those parts of embodiments thereof which are required for an understanding of the invention;

FIGS. 1 and 2, taken jointly by interconnecting the points marked *a*, show a circuit arrangement according to the invention;

FIG. 3 represents the principles applied in an embodiment of the invention, the circuit details of which are not of importance for an understanding thereof; and FIG. 4 illustrates voltage diagrams representing different conditions at various points in the circuit of FIGS. 1 and 2.

In FIG. 1, the relay C and the resistor R, which are connected in series, constitute a seizure circuit B to which the test circuit E, shown in FIGS. 1 and 2, is connected by way of the test line PL by selectors W, for instance rotary selectors, relay coupling fields or the like.

The relay C is deenergized when the test line PL leading to it is idle, that is, seizable. Its winding CII is then short-circuited by the contact *c*.

However, in seized condition, the relay C is connected over the test line PL, a selector W, by way of test resistors and the like with blocking potential, for instance ground potential, whereby it is energized so that its winding CII, which is short-circuited in normal condition, is included in the test circuit.

Upon the closure of a test circuit, for instance over the selector W, there is formed, as already proposed in a circuit arrangement, a voltage divider including the resistor R, the relay C, the choke D*r* and the resistor R1. The choke D*r* and the resistor R1 are so dimensioned, with due consideration of the electrical values of the resistor R and of the relay C and possibly so adjusted, that upon the connecting-through of this test circuit, with a released seizure relay C (winding CII short-circuited), there is established a potential at the test point *x*, which remains practically constant during the rise of current in a test circuit. The increase in voltage at the test point *x* exhibits a relatively steep slope, as illustrated in diagram (1) of FIG. 4 for the voltage $ux$ at $t0/t$.

In normal condition of the circuit, that is, when the test circuit over the test point *x* is not connected by a selector to an idle test line PL, different voltage divider circuits are operative in the test circuit. These voltage divider circuits can be so arranged that the indicated voltages of −60 volts, −24 volts and +4 volts are switched on only immediately before a setting (not described herein in detail) of the selector W. For this purpose there are closed contacts of a relay (not shown) belonging to the selector W, in the feed lines of the voltages of −60 volts, −24 volts, +4 volts. This relay is actuated immediately before a setting of selector W. Thereby the following voltage divider circuits are rendered operative:

(1)
G7, R8, Ground
+4, T2/R9, R7'
R6, −24
D1, R11, −60

(2) Ground, R1, D*r*, (*x*), R2, R4, G4, R10, −24;
(3) Ground, R18, R20/R17, T3, R21, −24;
(4) Ground, R16, R25, R13, −24;
(5) Ground, R14, R12, −60 (G6 blocked).

If a test circuit is now closed, for instance, by selector W, over an idle test line PL, in which the seizure relay C is deenergized, there is initially formed a voltage divider circuit:

(6) Ground, R1, D*r*, (*x*), W, PL, *c*, CI, R, −60.

Within the period of time indicated as *t*0/*t*1 in (1) of FIG. 4, at the test point *x* appears a partial voltage potential which remains approximately constant during the rise of current in the test current circuit because the test choke D*r* has approximately the same electrical properties as the seizure relay C. This voltage potential, starting from ground potential, shows a relatively steep slope. This voltage potential which is to be evaluated as a potential signifying idle condition, is operative with respect to the transistor T1. The slope of the voltage increase is flattened somewhat by the capacitors C1 and C8 so as to avoid the effect of interference voltage peaks which can occur for instances as a result of clicks, chattering of the contact which connects-through the test current circuit or the like, and in order to reduce the slope to a defined value. This slope however remains nevertheless relatively steep. The potential indicating idle condition, which effects the transistor T1, rises to above −24 v. The circuit (2) see column 5) thereby becomes inoperative since the rectifier G4 is now acted on in blocking direction. However, the transistor T1 becomes conductive and the following circuit becomes operative:

(7)
R14, Ground
−24, G8, T1, R12, −60
G6, R11
R25, G10, −24

In this circuit, there is produced between the diode D1 and the rectifier G6 a lower partial voltage potential than at the same point in the circuit (1) (see column 5), that is, below the Zener voltage of the diode, so that this branch of the circuit (1) is not conducting current. Accordingly, the base voltage of the transistor T2 rises to +4 v. and the transistor thereby is blocked; that is, the circuit (1) (see column 5) is reduced to the following circuit:

(8) Ground, R7, R6, −24.

Upon formation of the circuit (7) (see column 5), corresponding to the further negative rise in voltage at the test point *x* to above the value at which the transistor T1 becomes conductive, and within a given, relatively small voltage range, (for instance 1 volt), hereinafter called the test voltage range, at the test point *x*, the negative partial voltage at point *a* which was previously determined by the circuit (5) (see column 5) at almost −60 volts is reduced, that is, the voltage at point *x* becomes more negative and the voltage at point a becomes more positive. These voltages are designated in (1) of FIG. 4 as −*ux* and −*a*, their previously indicated course lying between time points *t*2 and *t*3. The slope of voltage reduction at point *a* corresponds to the slope of the voltage increase at test point *x* within said test voltage range. This reduction in voltage at point *a* effects transmission of a pulse (designated in (1) of FIG.4 as −*u*R 15), the amplitude of which is determined by the slope of this voltage reduction, over the capacitor C3 to the flip-flop circuit shown in FIG. 2, operatively affecting the latter as described below. The capacitor C3 has a differentiating effect. The voltage *ux* at the test point *x* increases further in the time period *t*2/*t*3 (see (1) of FIG. 4) above the test voltage range, which however has no further effect on the flip-flop circuit.

Ground potential is normally present at the point *y* in FIG. 2, by way of circuits not shown, whereby the transistor T3 of the flip-flop circuit is upon initiation of the testing operation, before the connecting-through of the test current circuit, traversed by current (see circuit (3) on column 5). The diode D2 is normally in blocking condition between ground potential (by way of resistor R15) and a partial voltage potential determined by the circuit (3).

Upon connecting the test circuit to an idler test line, the slope both of the voltage rise at the test point *x* and also of he voltage reduction at the point *a* and, accordingly, the amplitude of the impulse transmitted via the capacitor C3 are, as a result of the short-circuiting of the winding C(II), of a magnitude such that the Zener voltage of the diode D2 is during the impulse exceeded owing to the voltage drop occurring additionally at the resistor R15. During the corresponding interval, the voltage of the base of the transistor T3 becomes more positive, whereby the circuit (3) see column 5) becomes ineffective and is reduced to the following circuit:

(9) Ground, R18, R20, R21, −24

The voltage present at the base of the transistor T4 is more negative in the circuit (9) (see column 6) than in the circuit (3) (see column 5), so that the transistor T4 becomes conductive. The following circuit is produced:

(10) Ground, R17, T4/R16, R25, R13,−24

The transistor T3 is blocked due to the partial voltage which drops in this circuit at the resistor R16. In the circuit (9) (see column 6) a negative partial voltage drops at the diode D3 whereby the Zener voltage thereof is exceeded. This partial voltage acts on the transistor T5, blocked until now by ground potential, whereby the transistor becomes conductive. The relay P energizes in the following circuit:

(11) Ground, T5, *q*6 (*p*3), P,−24

At time point *t*3, indicated in (1) of FIG. 4, upon energizing, the relay P closes its contact *p*1, thereby effecting the branched circuit:

(12)
R10
R25, G10,
Ground, G4, T1, G5, R6, −24
*ql*, *pl*, G3, R2, (x), W, PL, c, CI, R, −60
R1, D*r*

The test register voltage potential (ground) is thereby connected to the test line, blocking the test line against seizure by other switch members. The test register voltage potential simultaneously acts on the test circuit E which remains effective in the following manner:

The partial voltage potential which drops at the rectifier G3 and at the resistor R2, acts on the test line as blocking voltage. The resistor R2 could be dispensed with as it serves merely as protective resistor. The transistor T1 remains conductive by the effect of the test register volttage potential, which is connected thereto, because the latter acts on its emitter by way of the rectifier G4 and since there is negative partial potential on the base of the transistor T1 by way of the rectifier G5, such partial potential dropping at the resistor R7 in the circuit (12). At the same time, the collector potential of the transistor T1 is likewise reduced. The voltage at the point *a*, however, remains at —24 volts by the effect of the rectifier G10, thus preventing chatter phenomena occurring at the contact *p*1 to affect the test circuit.

Relay Q is now energized in the circuit.

(13) Ground, *p*2, *q*3, Q(I),—24 such relay operatively responding with a time delay caused by its winding Q(II) at time point *t*4, indicated in (1) of FIG. 4, which is normally short-circuited by its own break contact *q*5 and the variable resistor R5, and briefly interrupting the circuit (12) (see column 6), in time *t*4/*t*5 by the action of break-before-make contact *q*1, *q*2. The circuit (13) is now interrupted at the contact *q*3 and the relay Q is maintained energized in the circuit:

(14) Ground, . . . . . , *q*4 Q(I),—24 the dots (. . . . .) indicating in this circuit suitable switching means, for instance relay contacts (not shown) which interrupt the circuit (14) only upon release of the test connection so that the relay Q responds operatively upon each testing and is maintained energized until release.

Furthermore, the contact *q*6 included in circuit (11) (see column 6) is opened, and contact *p*3 is closed to form a holding circuit in which relay P is held energized.

The energization time of the relay Q is adjustable by the resistor R5 which is included in the circuit:

(15) Q(II), *q*5, R5 and is individually and differently adjusted in the presence of a plurality of test circuits which are provided for testing the same lines, whereby lines may be simultaneously subjected to testing.

The positive potential will accordingly act as blocking potential on the test line PL during the time interval *t*3/*t*4, illustrated in (1) of FIG. 4 between the operative response of the relay P and that of the relay Q, and will be interrupted during the operative response time designated in (1) of FIG. 4 as *t*4/*t*5 of relay Q by the actuation of the switch contact *q*1, *q*2 and, therefore at time point *t*5, will be connected again. In the event that the partial potential characterizing the idle condition during the time span *t*4/*t*5 appears at point *x* again, upon interruption of the blocking, and if it remains during the period of time of the interruption, then the relay P will remain energized in the circuit (11) since the transistor T1 still remains conductive.

If it should happen that the two test circuits are simultaneously connected to the same test line PL, both such tests circuits could in the presence of a correspondingly unfavorable resistance of the seizure relay C lying at the other end of the test line, become operative in the manner described above. The relays P at the test circuit will be energized. If the relay P of one of the two test circuits first closes its contacts, the test register vlotage potential (ground) is connected over its contacts *p*1 to the test line PL.

This test register voltage potential will be operative on the respective test line by way of the series resistor R2 thereof, and only on the base of the transistor T1 and not on its emitter (rectifier G3 blocks), so that the transistor T1 is again blocked in the following manner:

The test register voltage potential lies, by way of the resistor R3, at the base of the transistor T1 and is more positive than the voltage which lies by way of the resistor R10 at its emitter. This potential cannot pass from the test line PL to the emitter owing to the blocking action of the rectifier G3. The circuit (7) (see column 5) will therefore not become conductive again. The circuit (1) will then become conductive again by way of the diode D1 and the transistor T2 therein will likewise become conductive; accordingly the rectifier G5 will be blocked. The flip-flop stage formed of the transistors T3 and T4 will be switched back into the readiness condition; the relay P will again be disconnected.

If the contract *p*1 of the relay P, due to electromagnetic and mechanical inertia is nevertheless still closed, there will be formed the following circuit:

(16)

*p*1, G4, R10,—24
Ground G3, R2, (*x*), W, PL, C (II), C (I), R,—60
R1, *Dr*

The rectifiers G3 and G4 are so dimensioned that by voltage drops thereon, in the circuit (16), a more negative voltage potential is fed to the emitter of the transistor T1 than to its base, so that the transistor T1 cannot again pass current in the circuit (16). Accordingly, the relay P can not be energized again.

In the event that the test circuits of two of such circuit arrangements as shown in FIGS. 1 and 2 are simultaneously connected by way of the same test line PL to the same seizure relay C, and that the two relays P and the two relays Q are energized simultaneously, and that within the reaction time of the test circuit E, the positive potential is simultaneously connected by the two contacts *p*1 for blocking the test line PL, the connection of this positive potential will be interrupted for periods of time which do not overlap each other owing to the differently set response times of the relays Q. The test circuit E, the associated relay Q of which first interrupts the blocking after the short time interval, receives by way of the test line PL which is common in this testing operation, blocking potential from the other circuit arrangements so that as a result of the blocking action of the rectifier G3 (see above), it interrupts the circuit (11) (see column 6) to the associated relay P. This relay P releases without time delay and interrupts at the contact *p*3 its holding circuit (14) (see column 7). Furthermore, at contact *p*1 of this test switching device, the barrier or blocking potential (circuit 12) (see column 6) which is applied to the test line PL and the connecting of which was briefly interrupted by actuation of the break-before-make contact *q*1, *q*2, is finally disconnected. For this purpose, the differences in the time intervals (response times of the different relays Q) are made greater than the release times of the respective relays P, so that the relay P, the corresponding relay Q of which has a shorter response time, is again released after the time interval of the interruption of the blocking of the test ilne which has been produced by the corresponding test circuit before the other relay Q, which has the larger response time, responds and interrupts the blocking connected by the other test circuit. This other test circuit is connected during its interruption of the blocking with the test line which is now idle and, accordingly, even after the interruption of the blocking, maintains the circuit (11) (see column 6) and the blocking of the test line.

The relay Q having the shorter response time remains energized in circuit (14) (see column 7) until release, so that circuit (11) (see column 6) remains interrupted at contact *q*6 and the relay P cannot be again energized by the other test circuit and respond during the interruption of the blocking during the same testing operation, even upon return of the partial potential at point *x* which characterizes the idle condition of the test line. In the other test circuit which, after the longer time interval, is the second to interrupt the connecting of the blocking potential, the partial potential at point *x* characterizing the idle condition of the test line PL, returns again for the entire period of time of the interruption. The holding circuit (11) (see column 6) of the associated relay P which extends by way of contact *p*3 is thus maintained.

The release time of the relay P is for this reason greater than the time interval required for the actuation of the break-before-make contact $q1$, $q2$ and less than the smallest difference between the two time intervals of the response times of different relays Q.

Moreover, the capacitor C8 is upon actuation of relay Q disconnected at the contact $q7$. As a result, the reaction time of the electronically operating test circuit E is shorter in the second testing operation taking place during the time interval of the disconnecting of the test register voltage potential (actuation of the contacts $q1$, $q2$) than the reaction time upon the original, first testing operation. Furthermore, the reaction time in the case of the first testing operation is greater than the respective time interval and smaller in the case of the second testing operation. The result is that for a first test connection which during the said time interval of the interruption of the connecting of the test register potential of blocking action of a second test connection, initiates the testing of the same test line, this period of time is too short for it to react but not for the second test connection which repeats the testing. This prevents one test circuit from taking an idle test line away from another.

In testing seized test line the voltage at the test point $x$ in FIG. 1 rises only to such a low value that the transistor T1 cannot become conductive. The circuit (7), therefore (see column 5), is not completed. Likewise there are omitted all the further switching processes as previously described in connection with circuit (7). Thereby the occupied state of the test line is detected.

Upon the release of a connection (call), the blocking of a test line by the test circuit is interrupted by disconnecting the test circuit therefrom. The test line which has been busied until that instant is thereupon likewise immediately interrupted by the switching device (or the like) which has been occupied until that time, by the deenergization of the relay in the test line, until complete release thereof. During the release time of such relay, the voltage potential characterizing the "idle" condition is accordingly actively present on this test line, although the respective input is not yet seizable. If a testing is at this instant initiated, by connection of another test circuit, as illustrated in (3) of FIG. 4, the current in the test line rises just as high as upon the testing of an idle test line, despite the increased resistance of the test line, as a result of the voltage induced in the windings of the said relay by the preceding condition of "release," the test line voltage $ux$ at first rises just as high as in the case of testing an idle line, thereupon somewhat dropping again.

If the voltage $ux$ on the test line PL exceeds the test voltage of −24 volts, the circuit (7) previously described in column 5 then exists. Further, at point $a$ the voltage is simultaneously reduced, as previously described in connection with the circuits (7) and (8) on column 5. The steepness of this voltage reduction at point $a$ is so slight, as a result of the differentiating effect of the capacitor C3, that the amplitude of the voltage pulse occurring on resistor R15 as a voltage drop is smaller than the breakthrough voltage of the Zener diode D2. The above described circuit (9) (see column 6) thus does not become effective, and the processes subsequently described with respect to this circuit do not take place. The relays P and Q do not respond and the tested test line is thus evaluated as occupied.

If, however, there is once disregarded the differentiating effect of the capacitor C3 and the effect of the Zener diode D2, it is then necesary to proceed from the assumption that through the voltage reduction at point $a$ and through the voltage pulse occurring as a voltage drop at resistor 15 there are formed the previously described circuits (9), (10), (11) and (12). From (3) of FIG. 4 it will be noted that at the time $t3$ the relay P responds and with its contact $p1$ completes the circuit (12). In the period of time bounded by the time points $t4$ and $t5$ the circuit (12) (see column 6) is interrupted. During this period of time the voltage at test point $x$ again rises. In consequence of the great inductance of relay C the voltage at test point $x$ does not within the space of time mentioned $t3/t4$, reach the voltage required for effecting a change in the condition of the transistor T1. Now if at time point $t5$ at (3) of FIG. 4 the contact $q2$ is again closed, the test line 12 then evaluated as occupied, because the relay P has aready dropped out in the period $t4/t5$ and can no longer respond over the contact $q6$ (see circuit (11) (column 6).

Upon testing a test line by way of a cable, which lies for instance between the selector W and the test line PL, its capacitance acts on the testing operation like a capacitor connected in parallel to the seizure circuit (seizure or private relay C and resistor R), namely:

The increase in current exhibits upon the testing of both an idle test line and of a test line which is in the process of being released, a current peak, the amplitude of which exceeds the normal final test current value and the duration of which is determined by the time constant of the cable discharge circuit.

If a test line which is in the process of being released, is now tested by way of a cable, the increase in current upon the connecting-through of the test circuit shows due to discharge of the cable a slope of a steepness which might stimulate that the test line is idle. This represented for the voltage $-ux$ at test point $x$ (FIG. 1) in (4) of FIG. 4. The relays P and Q respond thereupon as described, so that the test circuit E which electronically measures the test line voltage forms, based upon the current peak in the test circuit, the circuit (11) (see column 6). The relay P preferably has an extremely short response time and can, for this purpose, be also constructed of purely electronic switch means. At time point $t2$, as is apparent from (4) of FIG. 4, the circuit (12) (see column 6) is formed by way of the contact $p1$, over which the cable is discharged in low-ohmic manner. The resistor R2 serves as current limiting resistor and is preferably dimensioned so low, with due consideration of the highest permissible current for the contact $p1$, that the duration of the discharge of the cable is reduced as much as possible.

As described, the relay Q responds operatively in the circuit (14) (see column 7). Its response time is established at least sufficiently great (see circuit (15) on column 7 so as to effect full discharge of the cable during the corresponding time interval. Its response time is, however, substantially shorter than the duration of the increase in current in the test line. During the operative actuation of the relay Q, the connecting of the test register potential to the test line, which exerts a blocking action on said connection, during the period of time indicated at $t4/t5$ in (4) of FIG. 4, is briefly interrupted as described. It is ascertained whether the tested test line is in the process of being released or in idle condition. If the test line is idle, the test voltage which drops at the choke D$r$ and at the resistor R1, increases with relatively great steepness of slope before closing of the contact $q3$ to beyond the test voltage range which characterizes the idle condition after the building up of the current in the test circuit (see (1) of FIG. 4). If the test is in the releasing state, the testing voltage which drops at the choke D$r$ and at the resistor R1, increases with relatively slight steepness of slope after closing of contact $q2$ beyond the test voltage range which characterizes the idle condition of the current in the test circuit (see (4) of FIG. 4). The test line is evaluated as occupied, because the relay P has already dropped out in the period $t4/t5$ and can no longer respond over the contact $q6$ see circuit (11) (column 6).

The electronic voltage measurement circuit E can for this purpose evaluate both the rise of the test line voltage above the test voltage range, within the interruption caused by the contacts $q1$, $q2$, of the test register voltage potential which blocks the test line and holds the test circuit, and also the slope of the rise of the test line voltage after disconnection of the test register voltage potential by the contact $q1$. The slope of the rise in current in the test line is thereby determined in the first case from the voltage stage (difference quotient) passing within a given time interval, and in the second case, independently of a pre-established time interval and pre-established current stage, by means of the differentially acting capacitor C3 (differential quotient). Both procedures may be employed in combination in order to determine the slope of the rise of the current in the test line. The circuit arrangement described with reference to FIGS. 1 and 2 may be suitably dimensioned or slightly modified so as to satisfy the requirements of either one of these cases or the combination thereof.

It is in this way possible to reliably recognize the releasing condition upon testing a test line which is in the process of being released and which causes due to the cable discharge a slope of the rise in current which simulates the idle condition; the discharge of the cable is thereby additionally shortened by a discharge circuit which has substantially less resistance (R2, G3) than the measurement resistance (Dr, R1) lying in the test circuit. The latter is preferably developed as a complex resistance which (matched to the complex internal resistance of an unenergized seizure relay C with short-circuited winding C(II)) causes upon the connecting-through of the test circuit an extremely great voltage increase at the test point $x$ and a test voltage at such point $x$ which remains constant during the rise in current in the test line.

FIG. 3 shows in schematic manner a further example of an embodiment of the invention, illustrating the principles applied. To simplify the showing, known components such as gate circuits (Ga1, Ga2, Ga3) and flip-flop stages (K1, K2, K3) are represented by symbols which, with respect to their manner of operation, are known from the German DIN-Standard 40 700, Sheet 14, pages 1 to 6. The following description presupposes a knowledge of this manner of operation.

In resting or normal condition, the transistors T6 and T7 are blocked by ground potential or +4 v.-potential, respectively. The break contact z of a switching device which is associated with the test circuit shown in FIG. 3 is closed. The flip-flop stages K1, K2, K3 are by way of this break contact switched into an initial position which is to be presupposed for each testing operation. In order to initiate each testing operation, the contact $z$ is opened. Between successive testing operations, the flip-flop circuits K1, K2, K3 are brought into the required initial position by temporary closing of the contact $z$.

The test circuit shown in FIG. 3 is provided with an output A over which the successful testing is signaled to the circuit arrangement with which the test circuit is associated. The test circuit also comprises a complex test resistance which includes the choke Dr and the resistor R1, corresponding entirely to the complex resistance in FIG. 1 over which the test circuit is closed upon the testing of a test line.

Upon connecting the test circuit shown in FIG. 3 for the testing of a test line which is not shown in FIG. 3 but which corresponds to that shown in FIG. 1, and which leads to a seizure relay C such as shown in FIG. 1, by the selector or coupler W, to the respective test circuit, the voltage at the point $x$ rises with steep slope to a partial voltage if the test line is idle. However, if the test line is in the process of being released, the voltage at the test point $x$ rises with time delay. If the test circuit extends over a cable, the test voltage at point $x$, both in case of preceding idle condition and in case of preceding releasing condition of the test line, rises with equal steepness of slope caused by introduction of the cable discharge taking place over the test resistance Dr, R1, this slope being at least as great as upon testing an idle test line without cable. The duration of the discharge of a cable is due to the value of the cable capacitance several times shorter than the duration of the voltage rise at the test point $x$ upon testing a test line which is in the process of being released. Upon testing over a cable a test line which is in the process of being released, the voltage at the test point $x$ therefore rises during the duration of the cable discharge beyond the voltage potential indicating the idle condition and then drops again far below same, and temporarily rises again with time delay corresponding to the delayed current rise caused by the releasing operation, to above the voltage potential indicating the idle condition.

The voltage potential occurring at the test point $x$ can be evaluated by the test circuit shown in FIG. 3, both with respect to its magnitude and with respect to it course (steepness of slope). Upon evaluation of the voltage potential with respect to its value, there is evaluated the occurrence of such voltage potential indicating the idle condition of the test line within a specific interval of time. Upon evaluation of the voltage potential with respect to its course, there is evaluated, even before reaching the voltage potential indicating idle condition of the test line, the corresponding slope of the voltage rise in the voltage range traversed during a predetermined period of time and from this, by the principle of extrapolation, of the idle or releasing condition of the test line.

Upon connecting the circuit arrangement shown in FIG. 3 to an idle test line, the voltage increases at point $x$ with great steepness of slope, to a value characterizing the idle condition. This slope is limited by the capacitor C1 in order to make ineffective the influence of interference voltage peaks which may occur, for example, as a result of clicks, chattering of the contact connecting-through the test circuit or the like, and to reduce the slope to a defined value. The transistor T6 becomes conductive as a result of the rise in voltage. The voltage potential present up to now over the resistor W2 at its collector is shifted from −24 v. to −12 v. The presence of the −12 v. potential at one input of the gate Ga1 is evaluated by the latter as a signal.

The increase of the voltage at point $x$ causes the monostable flip-flop stage K3 with delay line to flip so that a signal appears at its output $h$. The nature of the signal is not indicated and is not important for an understanding of the invention. This signal is present at the output $h$ of the flip-flop stage K3 for a time (delay) established for it and is for this period of time independent of signals present at the inputs $f2$ and $f1$ of such flip-flop stage.

The shift of the potential on the collector of the transistor T6 which is evaluated as signal by the coincidence gate Ga1 and the signal given off by the flip-flop stage K3 lie simultaneously at the inputs of the coincidence gate Ga1 and cause appearance of a signal at its output. The bistable flip-flop stage K1 at the output $h$ of which no signal was present until then as a result of the signal present over the input $g1$ in normal condition of the contact $z$ is flipped, as a result of the signal applied to its dynamic input $g3$ and applies the signal to its output $h$.

This signal passes by way of the mixing gate Ga3 to the base of the transistor T7 which until then was blocked over the resistor W3 by +4 v. potential and makes it conductive so that the test line is immediately blocked by way of the resistor W4, the rectifier G3, the point x and the selector W. The resistor W4 serves to limit the current as protection for the transistor T7. The signal passing from the transistor T7 to one input of the blocking gate Ga2 is ineffective since such blocking gate Ga2 is blocked by the signal still present from the flip-flop stage K3. The transistor T6 is likewise blocked again, whereby the signal applied by way of the coincidence gate Ga1 to the dynamic input $g3$ of the flip-flop stage K1 is again deleted. The flip-flop stage K1 remains, however, uninfluenced thereby, since its input $g1$ is dynamic.

The signal given off by the bistable flip-flop stage K1 also appears at the input $f2$ of the monostable flip-flop stage K2 at the output $h$ of which no output signal was present until that time as a result of the signal present in normal condition at the input $f1$ from the contact $z$. As a result of the signal at the input $f2$ of the flip-flop stage K2, the latter is flipped so that a signal appears at its output *h*. This signal is by the flip-flop stage K2 applied to the output *h* during a fixed travel time which is shorter than the time interval (delay) of the flip-flop stage K3 and then disconnected. It appears at the input *g2* of the bistable flip-flop stage K1 which is thereby switched back into the position corresponding to the resting or normal condition. Accordingly, the signal at the output *h* of the flip-flop stage K1 is also extinguished. The signal at the output *h* of the flip-flop stage K2 passes to the mixing gate G*a*3 so that the transistor T7 remains conductive despite the elimination of the signal previously given off by the flip-flop K1 which made it conductive.

The monostable flip-flop stages K2 and K3 flip back into their initial position after the period of time determined therefor and again disconnect the signals present at their outputs *h*.

When the flip-flop stage K2 having the shorter operation time (delay) flips back into its starting position, the signal is extinguished at its output *h* so that the transistor T7 is again blocked by the positive potential present over the resistor W3. The blocking of the test line PL is thereby cancelled. Upon reappearance, at the point *x*, of the potential characterizing the idle condition of the test line, the transistor T6 again becomes conductive and extends a signal to the coincidence gate G*a*1. This signal appears at the coincidence gate G*a*1 before or after the end of the operation time (delay) of the flip-flop stage K3, depending upon the steepness of the slope of the voltage rise at the point *x* after cancellation of the blocking of the test line, that is, as a function of the time within which the potential at point *x* rises to the value indicating the idle condition of the test line. If this signal reaches the coincidence gate G*a*1 before the end of the operation time (delay), then, as a result of the coincidence, a signal passes to the input of the bistable flip-flop stage K1. The latter is again flipped so that a signal again appears at its output *h*. As previously described, this signal causes again the blocking of the test line and also passes to the input *f2* of the monostable flip-flop stage K2. The latter, however, as can be noted from the indicated German DIN Standard 40, 700, Sheet 14, pages 1 to 6, cannot be flipped a second time before the signal which is connected in resting condition by the contact *z* has been applied to the input *f1* of the flip-flop stage K2, that is, before the resting condition has been effected. The flip-flop stages K2 and K3 can therefore be flipped only once into their operating positions, during each testing operation, in which position they remain independently of any signals during their corresponding individual operation time (delay), whereupon they restore into their resting position. This signal, applied for the second time by the flip-flop stage K1 to the input *f2* of the flip-flop stage K2 is therefore ineffective with respect to the latter.

Upon switching of the flip-flop stage K3 back into its resting position, upon termination of its operation time interval (delay), after a signal has been connected to its output a second time by the flip-flop stage K1, the blocking of the blocking gate G*a*2 is cancelled due to absence of the signal at the output *h* of the flip-flop stage K3. G round potential is connected by the transistor T7 when the latter is made conductive over the mixing gate G*a*3 and such potential acts on the test line as a blocking potential, and by way of the blocking gate G*a*2 becomes operative as a signal on the output A of the test circuit, thereby signalling the successful testing.

If the steepness of the slope of the voltage rise at the test point *x* is smaller, when the blocking of the test line is for the repetition of the testing removed as a result of the return of the flip-flop stage K2 into the resting position due to expiration of its operation time (delay), then the voltage potential at point *x*, which makes the transistor T6 conductive, is reached only upon termination of the operation time (delay) of the flip-flop stage K3. The signal given to the coincidence gate G*a*1 in the form of the voltage shift −24 volt to −12 volt arrives at the latter after the signal given off by the flip-flop stage K3 during its operation time (delay) has already been extinguished. In this case, the flip-flop stage K1 will likewise not be flipped a second time, and the transistor T7 will accordingly not become conductive again. It follows, therefore, that blocking potential will not be connected from this test circuit by way of the resistor W4 and the rectifier G3, to the test line nor will a signal be given to the output A over which successful testing operations are signaled.

Accordingly, as described, the operation of the test circuit shown in FIG. 3 effects upon determination of the voltage potential indicating the idle condition or possibly the releasing condition of the test line, instantaneous blocking thereof by way of the transistor T7. If the testing is effected over a cable which is charged upon testing an idle test line or else a test line which is in the process of being released, and which, upon the presence of the releasing condition causes by its charge, upon the connecting-through of the test circuit, a rise in current simulating the idle condition, the cable will discharge immediately by way of the circuit conecting the barrier or blocking potential, which circuit may have a very low resistance. After an interval determined by the operation time (delay) of the flip-flop stage K2, which interval is preferably matched to the duration of the discharge of the cable, the blocking is removed and the testing repeated with the aid of the transistor T6. From the steepness of the slope of the voltage rise at point *x* after removal of the blocking and possibly after the discharging of the cable, is determined the actual condition of seizure, that is, idle or releasing condition which is respectively found when the second voltage potential establishes itself before or after the expiration of the period of time limited by the operation time (delay) of the flip-flop stage K3. This period of time therefore results from the difference in the operation times (delays) of the flip-flop stages K2 and K3. Such period of time begins with the end of the operation time (delay) of the flip-flop stage K2 and terminates with the operation time (delay) of the flip-flop stage K3.

It is also possible to give off a signal indicating the releasing condition, for instance by a further blocking gate (not shown) which is connected just like the blocking gate G*a*2, but with inputs reversed.

Moreover, double testing can be definitely prevented by the present test circuit, in that the time intervals of a plurality of test circuits testing, possibly simultaneously, the same lines, are adjusted individually and alternately differently by corresponding dimensioning of the flip-flop stages K2 and K3. Double testing can thus be suppressed in the same manner as described in connection with FIG. 1.

It is for this purpose advantageous that in the case of a first testing circuit in which the operation time (delay) of the flip-flop stage K3 is greater than the operation time (delay) of the flip-flop stage K3 of a second test circuit, the operation time (delay) of the flip-flop stage K2 is likewise greater than the operation time (delay of the flip-flop stage K3 of the second testing circuit. This assures that of a plurality of test circuits, the time intervals of which are established differently, the time intervals during which the testing is repeated do not overlap.

The invention is not inherently limited to the details described herein and illustrated in the drawings. Accordingly, changes may be made within the scope and spirit of the appended claims which define what is believed to be new and desired to have protected by Letters Patent.

I claim:

1. In a circuit arrangement for communication systems, particularly telephone systems, wherein the idle conditions and in given cases the releasing condition of test lines is indicated by a first voltage potential and the occupied condition thereof by a second voltage potential, wherein the particular momentary condition of seizure of a test line is determined, and after determination of the idle condition the test line is blocked, the combination of means forming a test circuit which includes the involved test line, test circuit means connected to said test circuit for ascertaining the condition of seizure of the test line connected thereto by determination of the presence of potential in said test circuit representative of said first or second voltage potential, first test switch means for rendering the test circuit means inoperative, said test circuit means comprising means responsive to the presence of a potential in said test circuit representing said first voltage potential, in the event of continued existence of said test circuit, for actuating said first test switch means to render said test circuit means inoperative, second test switch means for deactuating said first mentioned test switch means immediately following a first predetermined period of time to restore said test circuit means to operative condition for a second predetermined period of time, whereby the actual conditions of seizure of the test line are determinable by the test circuit means from the test line voltage potential which is in the idle condition, present prior to the expiration of said second period of time, and which is in the releasing condition, present after the expiration of the said second period of time.

2. A circuit arrangement according to claim 1, wherein said test circuit is in the form of a voltage divider which includes a measuring resistance, said test circuit means being operatively connected to the midpoint of such voltage divider for measuring the voltage potential thereat.

3. A circuit arrangement according to claim 2, wherein said measuring resistance is characterized by a complex internal resistance, whereby, upon connection of the test circuit, a voltage potential occurring at such resistance is constant during the current rise in the test line.

4. A circuit arrangement according ot claim 3, wherein the measuring resistance has an internal resistance such that a test line will not be blocked upon connection of the measuring resistance thereto.

5. A circuit arrangement according to claim 1, wherein said first test switch means is constructed to effect a blocking of the test line during the first predetermined period of time.

6. A circuit arrangement according to claim 5, wherein said first test switch means is constructed to apply blocking potential to the test line during said first period of time, and a resistance operatively connecting such blocking potential to the test line, the resistance of which is smaller than the measuring resistance.

7. A circuit arrangement according to claim 2, wherein said test circuit is constructed to provide a discharge circuit to which the test line is connected during said first period of time.

8. A circuit according to claim 1, wherein the test circuit means is provided with means for differentiating the voltage potential prior to the end of the second period of the test line current following the end of the first period of time providing a criterion with respect to the actual conditions of seizure as to idle or releasing condition.

9. A circuit arrangement according to claim 1, wherein said test circuit means, in dependence upon one of said test switch means, is constructed to measure the test line voltage potential and evaluate the presence of the first voltage potential period to the end of the second period of time as the idle condition.

10. A circiut arrangement according to claim 9, wherein said first test switch means is constructed to place, after determination of the first voltage potential of a test line, a blocking potential thereon, the respective means thereof comprising time switches which are arranged to maintain the blocking during the first period of time and at the end thereof to discontinue the same, and through which the test circuit means is again activated for the testing of the condition of seizure during the second period of time, said test circuit means being constructed to replace such blocking upon the recurrence of the idle condition during said second period of time, said time switches being so arranged that the magnitude of the respective second periods of time of a plurality of such circuit arrangements adapted to test the same lines, is in such case adjusted at a different value.

11. A circuit arrangement according to claim 10, wherein said time switches are so arranged that each of the differences of the first periods of time individual to the plurality of circuit arrangements is greater than the duration in which the circuit arrangements restore such blocking upon recurrence of the idle condition following said elimination of the blocking.

12. A circuit arrangement according to claim 8, wherein said first test switch means is constructed to place, after determination of the first voltage potential of a test line, a blocking potential thereon, the respective means thereof comprising first switches which are arranged to maintain the blocking during the first period of time and at the end thereof to discontinue the same, and through which the test circuit means is again activated for the testing of the condition of seizure during the second period of time, and time switches being constructed to replace such blocking upon the recurrence of the idle condition during said second period of time, and adjustable means cooperable with one of said time switches whereby the magnitude of the second period of time can be adjusted at different values, and with the use of a plurality of such circuit arrangements adapted to test the same lines, the magnitude of the respective second periods of time may be adjfiusted at different values.

13. A circuit arrangement according to claim 12, wherein said time switches are so arranged that each of the differences of the first periods of time individual to the plurality of circuit arrangements is greater than each corresponding second period of time.

14. A circuit arrangement according to claim 12, wherein said time switches are so arranged that each of the differences of the first periods of time, individual to the plurality of circuit arrangements, is greater than the duration of time during which the respective test circuit means are released upon absence of the idle condition after elimination of the blocking.

15. A circuit arrangement according to claim 12, wherein said test switch means is so arranged that the duration of the testing period of the first operative actuation of the test circuit means is greater than said second period of time.

16. A circuit arrangement according to claim 12, wherein one of said test switch means is so arranged that the response time for the operative actuation of the test switch means upon recurrence of the idle condition, after elimination of the blocking, is shorter than said second period of time.

17. A circuit arrangement according to claim 12, wherein one of said test switch means is constructed to apply test register voltage potential (ground) to the test line, whereby the second voltage potential is adjfiustable on the test line, said one test switch means being constructed to become operatively ineffective test-wise by the second voltage potential, said one test switch means being so constructed that the test register voltage potential connected simultaneously to the test line and to said one test switch means is operative to retain said test circuit means operatively connected to the test line.

18. A circuit arrangement according to claim 17, wherein the construction of said one test switch means is such that the test register voltage potential is applied to the test input by high resistance, low inertia test switch means including auxiliary switch means controlled thereby, said one test switch means and auxiliary switch means being so constructed that the duration of the operative effectiveness and the duration of becoming operatively ineffective, of said one test switch means is smaller, and the duraiton of becoming operatively effective of the auxiliary switch means is longer than the second period of time.

19. A circuit arrangement according to claim 17, comprising first auxiliary switch means in which the result (idle or releasing condition, respectively, or blocked condition) of the first testing operation is stored, and second auxiliary switch means in which the result (idle condition or releasing condition) of the repetition of the testing operation is stored.

20. A circuit arrangement according to claim 19, wherein said first auxiliary switch means is constructed to disconnect the blocking of the test line upon the storage of the result of the first testing operation and thereafter reconnect it.

21. A circuit arrangement according to claim 19, wherein the first auxiliary switch means comprises a relay having changeover contacts, the make and break sides of which are connected, said contacts being operatively inserted in the blocking potential line to the test line.

22. A circuit arrangement according to claim 17, wherein the switch means operable to connect the test register voltage potential to the test line is constructed to simultaneously connect such potential to the test switch means.

23. A circuit arrangement according to claim 1, comprising delay means connected to the input of the test circuit means for determining the length of the reaction time of the test switch means.

References Cited

UNITED STATES PATENTS

| | | | |
|---|---|---|---|
| 2,709,203 | 5/1955 | Buchner | 179—18 |
| 3,247,325 | 4/1966 | Han et al. | 179—18 |

FOREIGN PATENTS

| | | |
|---|---|---|
| 1,347,787 | 11/1963 | France. |

KATHLEEN H. CLAFFY, *Primary Examiner.*